United States Patent Office 3,444,294
Patented May 13, 1969

3,444,294
AIDING THE REGRESSION OF ACUTE LEUKEMIA WITH 1 - BETA - D - ARABINOFURANOSYLCYTOSINE
James H. Hunter, Kalamazoo, Mich., assignor to The Upjohn Company, Kalamazoo, Mich., a corporation of Delaware
No Drawing. Application Sept. 1, 1965, Ser. No. 484,473, which is a continuation-in-part of applications Ser. No. 217,543, Aug. 17, 1962; Ser. No. 83,899, Jan. 23, 1961; Ser. No. 24,890, Apr. 27, 1960, now Patent No. 3,116,282, and Ser. No. 802,650, Mar. 30, 1959. Divided and this application Apr. 3, 1967, Ser. No. 627,645
Int. Cl. A61k 27/00
U.S. Cl. 424—180                              2 Claims

ABSTRACT OF THE DISCLOSURE

Processes of aiding regression and palliation of acute leukemia in human hosts comprising systemic administration to the hosts of an effective amount of 1-$\beta$-D-arabinofuranosylcytosine or a nontoxic acid addition salt thereof. Preferably the active ingredient is administered in a sufficient amount to provide dosages over the range from about 2 mg. to about 50 mg. per kilogram of body weight of the host.

CROSS REFERENCE TO RELATED APPLICATIONS

This application is a division of copending application Ser. No. 484,473, filed Sept. 1, 1965, now U.S. Patent 3,397,268. The latter is a continuation-in-part of application Ser. No. 217,543, filed Aug. 17, 1962, now abandoned; Ser. No. 83,899, filed Jan. 23, 1961, now abandoned; Ser. No. 24,890, filed Apr. 27, 1960, now U.S. Patent 3,116,282; and Ser. No. 802,650, filed Mar. 30, 1959, now abandoned.

BRIEF SUMMARY OF THE INVENTION

This invention relates to processes of ameliorating acute leukemia in human hosts. The essential active ingredient, utilized in the processes in an effective amount, is 1-$\beta$-D-arabinofuranosylcytosine or a nontoxic acid addition salt thereof. From about 2 mg. to about 50 mg. per kilogram of body weight of the host is the preferred range for the essential active ingredient.

DETAILED DESCRIPTION

This invention relates to a pharmaceutical composition and the use thereof and more particularly to a pharmaceutical nucleoside composition and to a process for its administration.

The inventive composition is a nucleoside composition comprising 1-$\beta$-D-arabinofuranosylcytosine and certain derivatives thereof dispersed in a pharmaceutically acceptable carrier. 1-$\beta$-D-arabinofuranosylcytosine and the derivatives can be prepared according to the methods disclosed in copending application Ser. No. 24,890, filed Apr. 27, 1960, now U.S. Patent 3,116,282. The derivatives include the acid-addition salts, for example, those of hydrochloric, citric, succinic, maleic, tartaric, and like acids. Of the acid-addition salts the hydrochloride is preferred.

The modes contemplated by the inventor of carrying out the invention include pharmaceutical compositions and processes of administration thereof.

Solutions of the principal active ingredient can be prepared in water or in water suitably diluted with, for example, ethanol, glycerin, edible polyols (for example, glycerine, polyethylene glycols, propylene glycol), and the like. Dispersions can be prepared in glycerol, liquid polyethylene glycols, and mixtures thereof, and in oils. Under ordinary conditions of storage and use, these preparations contain a preservative to prevent the growth of microorganisms.

As stated above, the pharmaceutical compositions can be in forms suited for injectable use, which forms include sterile aqueous solutions or dispersions and sterile powders for the extemporaneous preparation of sterile injectable solutions or dispersions. In all cases the form must be sterile and must be fluid to the extent that easy syringeability exists. It must be stable under the conditions of manufacture and storage and must be preserved against the contaminating action of microorganism such as bacteria and fungi. The basic solvent or dispersion medium can contain water, ethanol, polyols (for example, glycerol, propylene glycol, and liquid polyethylene glycol, and the like), suitable mixtures thereof, and vegetable oils. The proper fluidity can be maintained, for example, by the use of a coating such as lecithin, by the maintenance of the required particle size in the case of dispersions and by the use of surfactants (for example, a condensation product of ethylene oxide with fatty acids or fatty alcohols, partial esters of fatty acids and a hexitol anhydride, and polyoxyethylene condensation products of the esters). The prevention of the action of microorganisms can be brought about by various antibacterial and antifungal agents, for example, parabens, chlorobutanol, benzyl alcohol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

Sterile injectable solutions are prepared by incorporating the principal active ingredient in the required amount in the appropriate solvent with various of the other ingredients enumerated above, as required, followed by filter sterilization. Generally, dispersions are prepared by incorporating the previously sterilized active ingredient into a sterile vehicle which contains the basic dispersion medium and the required other ingredients from those enumerated above.

In the case of sterile powders for the preparation of sterile injectable solutions the preferred method of preparation is the freeze-drying technique which yields a powder of the active ingredient plus any additional desired ingredients from a previously sterile-filtered solution thereof. The powders can also be sterilized by the use of a gas, for example, ethylene oxide and subsequently incorporated, with the required additional ingredients and in the proper particle size, into the basic powder for later reconstitution with the desired suspending liquid which, of course, itself must be sterile.

Supplementary active ingredients can be incorporated into the inventive compositions. These ingredients include, for example, mechlorethamine hydrochloride and 5-bis(2-chloroethyl)amino-uracil; triethylene melamine; actinomycin C; cycloheximide.

It is especially advantageous to formulate the inventive compositions in dosage unit form for ease of administration and uniformity of dosage. Dosage unit form as used in the specification and claims herein refers to physically discrete units suited as unitary dosages for the animal and human subjects to be treated, each unit containing a predetermined quantity of active material calculated to produce the desired therapeutic effect in association with the required pharmaceutical carrier. The specifications for the novel dosage unit forms of this invention are dictated by and directly dependent on (a) the unique characteristics of the active material and the particular therapeutic effect to be achieved and (b) the limitations inherent in the art of compounding such an active material for the treatment of disease in living subjects having a diseased condition in which bodily health is impaired as disclosed in detail in this specification, these being features of the present invention.

The dosage of the principal active ingredient for the treatment of the indicated condition depends on the age, weight and condition of the subject being treated; the particular condition and its severity; the particular form of the active ingredient and the route of administration. A dose of from about 0.1 to about 50 mg./kg. or a daily total dose of from about 3 to about 400 mg. given singly or in divided doses of up to 5 times a day embraces the effective range for the treatment of most conditions for which the compound is effective. Expressed as amounts suited for single doses, from about 3 to about 1000 mg. is operable.

The principal active ingredient is compounded for convenient and effective administration in effective amounts with a suitable pharmaceutically-acceptable carrier in dosage unit form as hereinbefore described. A unit dosage form can contain the principal active ingredient in amounts ranging from about 3 to about 1000 mg. per unit. Expressed in proportions the active ingredient is present in from about 0.5 to about 25% w./v. of the liquid compositions.

Concentrations suited for injection range from about 10 to about 25% w./v. of the principal active ingredient in a sterile injectable pharmaceutical carrier.

In the case of compositions containing supplementary active ingredients, the dosage is determined by reference to the usual dose and manner of administration of the said ingredients.

Regression and palliation of leukemia are aided; for example, various techniques of parenteral administration can be utilized. A single intravenous dosage or repeated daily dosages can be administered for up to 5 to 10 days. There are provided thereby total dosages of from about 10 to about 50 mg./kg. Also, dosages can be administered by continuous infusion, for example, for from about 8 hours to about 24 hours, to provide from about 2 to about 3 mg./kg. during such time. As will be seen from such dosage regimens, the amount of principal active ingredient administered is a sufficient amount to aid regression and palliation of the leukemia in the absence of excessive deleterious side effects of a cytotoxic nature to the hosts harboring the leukemia. Specific modes of administration are 50 mg./kg. once weekly; 5 mg./kg. for about 7 to 10 days; 5 or 10 mg./kg. for about 3 to 5 days; and infusion of a solution containing a sufficient quantity of the principal active ingredient to provide 2 mg./kg. for about 14 hours.

The following examples set forth the manner and process of making and using the inventive compositions and include the best mode contemplated by the inventor of carrying out the invention.

EXAMPLE 1

Tablets for oral administration 1000 scored tablets for oral use, each containing 500 mgs. of 1-β-D-arabinofuranosylcytosine, are prepared from the following types and amounts of ingredients:

|  | Gms. |
|---|---|
| 1-β-D-arabinofuranosylcytosine | 500 |
| Starch, U.S.P. | 35 |
| Talc, U.S.P. | 25 |
| Calcium stearate | 3.5 |

The powdered active ingredient is granulated with a 4% w./v. aqueous solution of methylcellulose U.S.P. To the dried granules is added a mixture of the remainder of the ingredients and the final mixture is compressed into tablets of proper weight.

Satisfactory clinical response is obtained in adults with acute leukemia with 1 tablet 3 times a day.

Similarly, tablets each containing 1000 mg. of 1-β-D-arabinofuranosylcytosine are prepared by increasing the amount thereof to 1000 gm.

EXAMPLE 2

Injectable solution

A sterile aqueous solution suitable for intramuscular or intravenous use, and containing 250 mg. of 1-β-D-arabinofuranosylcytosine hydrochloride in each ml., is prepared from the following ingredients:

| 1-β-D-arabinofuranosylcytosine hydrochloride | gm | 250 |
|---|---|---|
| Water for injection, q.s. | ml | 1000 |

A daily dose of 1 ml. provides a satisfactory clinical response.

EXAMPLE 3

Injectable preparation

A sterile aqueous preparation suitable for intramuscular injection and containing 25 mg. of 1-β-D-arabinofuranosylcytosine in each 2 mls. is prepared from the following ingredients:

| 1-β-D-arabinofuranosylcytosine | gm | 12.5 |
|---|---|---|
| Polyethylene glycol, 4000 U.S.P. | gm | 30 |
| Sodium chloride, U.S.P. | gm | 9 |
| Preservative, q.s. | | |
| Water for injection, q.s. | ml | 1000 |

EXAMPLE 4

Injectable preparation

A sterile preparation suitable for intramuscular injection and containing in each milliliter 100 mg. of 1-β-D-arabinofuranosylcytosine is prepared from the following types and amounts of materials:

| 1-β-D-arabinofuranosylcytosine | gm | 100 |
|---|---|---|
| Aluminum monostearate-peanut oil gel, q.s. to | ml | 1000 |

A mixture of 2 parts aluminum monostearate and 98 parts of peanut oil is slowly heated with stirring to a temperature of 100° C. The temperature is maintained at this level for 1 hour when gelling is complete and is then raised to 150° C. and maintained at this temperature for 1 hour. The gel is then cooled and 100 grams of sterile, powdered active ingredient is incorporated aseptically with stirring and the total volume made up to 1000 ml. with additional gel and further stirring.

EXAMPLE 5

Sterile powder for reconstitution

Sterile vials each containing 50 mg. of 1-β-D-arabinofuranosylcytosine hydrochloride are prepared by first sterilizing 50 gm. of the principal active ingredient by treatment with ethylene oxide and thereafter filling 50 mg. into each of 1000 sterile vials. At the time of use, the contents of a vial are reconstituted with q.s. water for injection to provide a sterile solution for injection administration.

EXAMPLE 6

Intravenous preparation 24,000 ml. of sterile solution are prepared as follows:

| Each mil.: | | Total |
|---|---|---|
| 57.5 mg. cytarabine hydrochloride | gm | 1380 |
| 5 mg. sodium citrate | gm | 120 |
| 9.45 mg. benzyl alcohol | gm | 227 |
| 2.3 mg. sodium bisulfite | gm | 55.2 |
| Sodium hydroxide (50% aqueous solution), q.s. | | |
| Water for injection, q.s. ad | ml | 24000 |

Directions: Dissolve the principal active ingredient, sodium citrate and benzyl alcohol in 2,000 ml. water. Add the sodium bisulfite and adjust the pH 7.0 with the alkali.

Make up to volume. Sterile filter the whole. Fill into 10 ml. sterile vials.

What is claimed is:
1. A process of aiding regression and palliation of acute leukemia in humans which comprises the systemic administration to humans hosting the leukemia of an effective amount of a member selected from the group consisting of 1-β-D-arabinofuranosylcytosine and a non-toxic acid addition salt thereof dispersed in a pharmaceutical carrier.
2. A process of aiding regression and palliation of acute leukemia in human hosts which comprises the systemic administration to the human host of a sufficient amount of a member selected from the group conisting of 1-β-D-arabinofuranosylcytosine and a non-toxic acid addition salt thereof to provide a dosage of from about 2 to about 50 mg./kg. by weight of the host.

References Cited

UNITED STATES PATENTS 3,116,282   12/1963   Hunter _____ 260—211.5

OTHER REFERENCES

Spencer, Cancer Research, vol. 25, No. 4, part 2, May 1965, pp. 999, 1002–1004, 1006–1011 and 1015–1019.

Evans et al., Proc. Soc. Exp. Biol. and Med., February 1961, vol. 106, pp. 350–353.

FRANK CACCIAPAGLIA, JR., *Primary Examiner.*

J. GOLDBERG, *Assistant Examiner.*